United States Patent
Oteki

[15] 3,669,456
[45] June 13, 1972

[54] CASSETTE MOUNTING AND DISMOUNTING DEVICE

[72] Inventor: Yuzo Oteki, Tokyo-to, Japan

[73] Assignee: Beltek Kabushiki Kaisha, Tokyo-to, Japan

[22] Filed: Dec. 1, 1969

[21] Appl. No.: 881,117

[30] Foreign Application Priority Data

Feb. 21, 1969 Japan..................................44/12511

[52] U.S. Cl..............................274/4 C, 274/4 E, 242/198, 226/89
[51] Int. Cl.......................................................G11b 23/10
[58] Field of Search.......................226/89, 90, 176; 242/197–200, 181, 55.18, 55.19; 274/4 B, 4 C, 4 E, 4 F, 4 G, 11 B, 11 C; 179/100.2 Z

[56] References Cited

UNITED STATES PATENTS

| | | | |
|---|---|---|---|
| 3,395,871 | 8/1968 | Ackermann et al. | 274/4 C |
| 3,471,071 | 10/1969 | Lane | 226/89 |
| 3,485,500 | 12/1969 | Loeschner | 274/11 B |
| 3,494,572 | 2/1970 | Vemura | 274/4 C |
| 3,511,508 | 5/1970 | Ban | 274/4 F |

Primary Examiner—Allen N. Knowles
Attorney—Holman & Stern

[57] ABSTRACT

A device comprising a casing for receiving a cassette, a suspending plate for swingably lowering or elevating the casing, a tumbler spring for automatically receiving and expelling the cassette in and out of the casing, means for automatically displacing the cassette and casing to an operating position comprising a locking lever and a slidable plate, a cassette dismounting plate having a push button, and a knife-edged member rotatable around a fixed point in accordance with the displacement of the dismounting plate, so that when a cassette is pushed into the casing past a predetermined point, the cassette is automatically brought into the operable position, and, when the push button is depressed, the cassette is automatically removed from the operable position and expelled from the casing.

3 Claims, 8 Drawing Figures

INVENTOR.
Yuzo Oteki
BY Holman, Blascock,
Downing & Seebold
ATTORNEYS 3,669,456

CASSETTE MOUNTING AND DISMOUNTING DEVICE

BACKGROUND OF THE INVENTION

This invention relates generally to cassette type, tape mounting and dismounting devices, and more particularly to such devices wherein the cassette is automatically mounted into its operating position by simply pushing the cassette into an inlet port of a casing and is expelled from the casing when a releasing push button is depressed.

Previously, I have proposed a cassette type tape mounting and dismounting device for a tape recording and reproducing apparatus which is so organized that after the insertion of the cassette into a mounting port of a casing, a push button is depressed to rotate a cam plate around a shaft, whereby a sliding plate provided with a slot is moved in one direction, and a suspending plate engaging the slot is moved up or down together with the cassette casing.

However, such a conventional construction is inconvenient in that a push button must be depressed after the insertion of the cassette and has made the cassette mounting procedure rather troublesome and complicated.

SUMMARY OF THE INVENTION

Therefore, a primary object of the present invention is to provide a novel construction of the cassette mounting and dismounting device whereby the above described drawbacks are substantially eliminated.

Another object of the invention is to provide an improved construction of an automatic cassette mounting and dismounting device wherein the cassette is automatically brought into its operating position by simply inserting the cassette into the cassette casing, and is dismounted in one action by depressing a dismounting push button.

Still another object of the present invention is to provide an improved construction of the cassette mounting and dismounting device, wherein, when the cassette is inserted into the cassette casing, both the cassette and the casing are automatically brought to the operating position of the tape recording and reproducing apparatus by the disengagement of a locking lever and a slidable plate, so that the tape in the cassette contacts a tape driving mechanism such as a pinch roller and a magnetic head for recording and reproducing the magnetic tape, and driving of the tape and the recording and reproduction of sound on and from the tape are thereby effected.

A further object of the present invention is to provide an improved construction of the cassette mounting and dismounting device, wherein, when a releasing knob is depressed, a tape driving mechanism such as a pinch roller and a tape recording and reproducing mechanism such as a magnetic head release and are retracted from the tape encased in the cassette, with the cassette case receiving the cassette being simultaneously forced back to the original position, whereby the cassette is further ejected from the cassette casing.

These and other objects of the present invention are achieved by an improved construction of the cassette mounting and dismounting device which comprises a casing for receiving the cassette, a sliding member having a projection to engage the central hole of the tape reel included in the cassette and being slidable against the resilient force of a tumbler spring so that when the cassette is inserted into the casing beyond a predetermined point, the cassette is automatically advanced to the ultimate position in the casing by the resilient force of the tumbler spring, a locking lever abutting against the forward end of the cassette for releasing a slidable plate having a slit, a suspending plate attached to the casing and guided in the slit in the slidable plate for lowering and elevating the casing, a pin provided on the slidable plate for initiating the displacement of a pedestal for a pinch roller, the pedestal in turn displaces the recording and reproducing magnetic heads to and from the operating position, a cassette dismounting plate having a push button which pushes back the slidable plate for elevating the casing and retracting the pinch roller and the magnetic heads, and a knife-edged member rotatable around a fixed shaft on the cassette dismounting plate and operable to push back the sliding member against the resilient force of the tumbler spring so that the cassette is expelled from the casing.

The nature, principle, and utility of the present invention will be more apparent from the following description with respect to a preferred embodiment thereof when read in conjunction with respect to a preferred embodiment thereof when read in conjunction with the accompanying drawings, in which like parts are designated by like reference numerals and characters.

DETAILED DESCRIPTION

Figure 3:
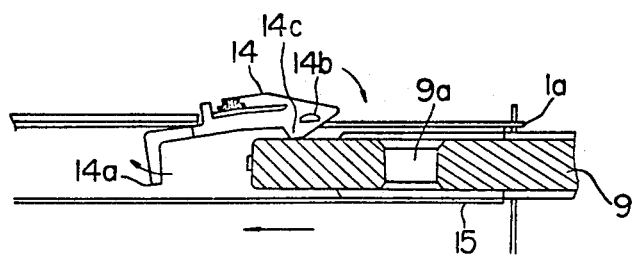
FIG. 3 is a fragmentary, partially sectioned profile view of the device shown in FIG. 1.
Figure 4:
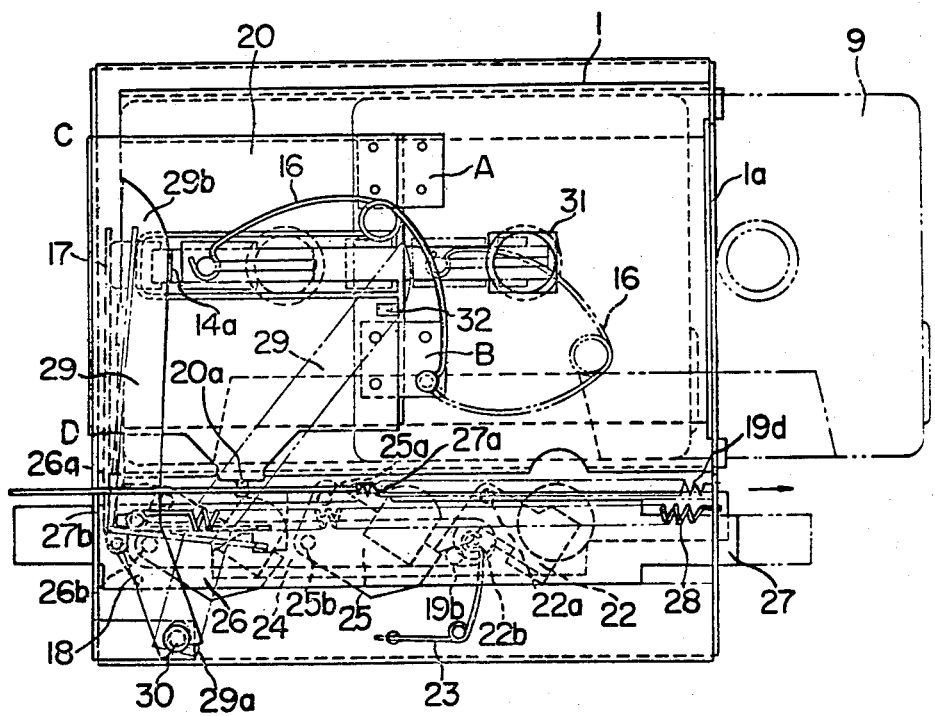
FIG. 4 is a top plan view similar to FIG. 2 for a description of the operation of the device.

Referring now to FIG. 3 which is a fragmentary, partially sectioned profile view of the cassette mounting and dismounting device according to the present invention, it is seen that when a cassette 9 is inserted into a cassette mounting port 15a of a casing 15, a downwardly projecting portion 14c of a sliding member 14 contacts the upper surface of the cassette 9, and, when the cassette 9 is further advanced into the port 15a, the projecting portion 14c of the sliding member 14 finally engages with central hole 9a of a reel contained in the cassette.

Figure 2:
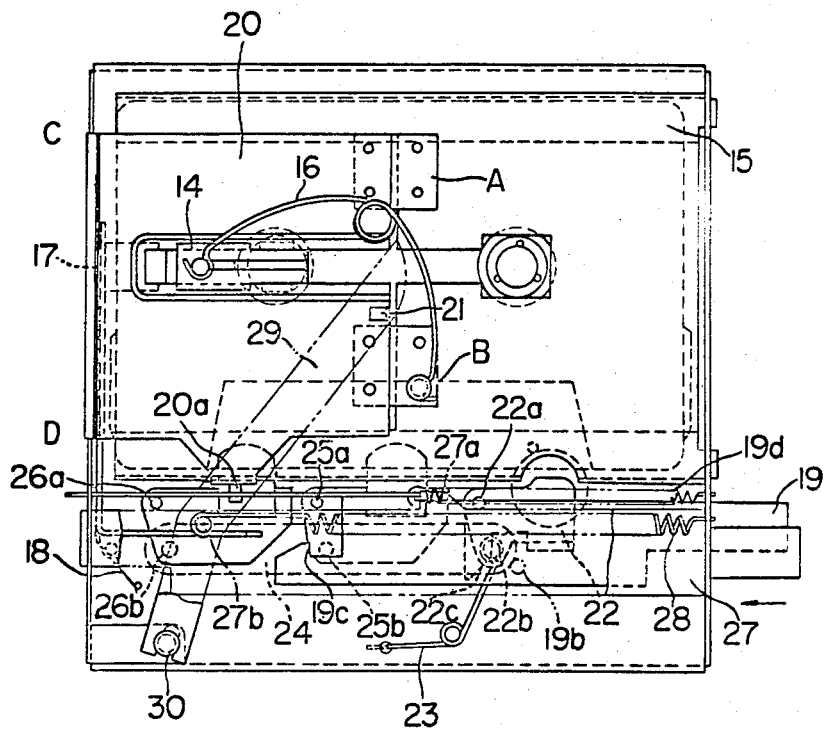
FIG. 2 is a top plan view of the same device in an operating state.

When the cassette 9 is further advanced in the casing 15, the sliding member 14 is pushed along a groove provided through a suspending plate 20 together with the cassette 9, as best seen in FIG. 2, against the resilient force of a tumbler spring 16. However, when the sliding member 14 is pushed forward beyond a predetermined point which is nearest to the supporting point of the other arm of the tumbler spring 16, the cassette 9 is forced into the casing 15 of the cassette mounting and dismounting device according to the present invention.

Figure 5:
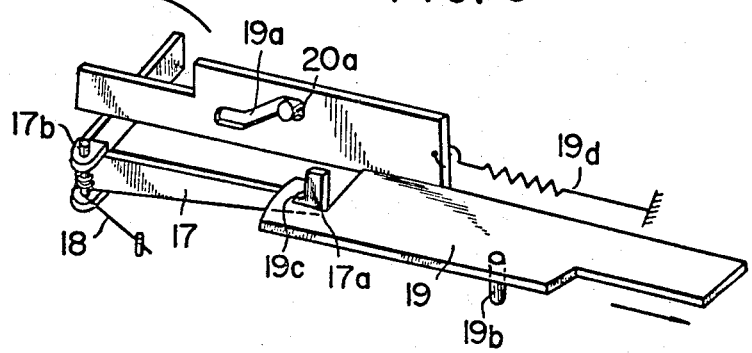
FIGS. 5 and 6 are perspective views of certain parts of the device for a description of the operation thereof.

At the last stage of the cassette insertion, a locking lever 17 is rotated by the forward end of the cassette 9 against the resilient force of a spring 18 around a shaft 17b, (FIG. 5) whereby the engagement of the locking lever with a slidable plate 19 is broken.

Figure 1A:
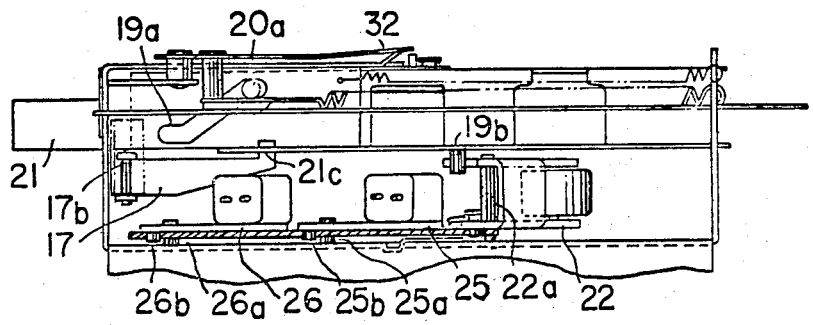
FIGS. 1(a) and 1(b) are an elevational view with parts cut away and a top plan view, respectively, of a cassette type tape mounting and dismounting device according to the present invention in a state prior to operation.
Figure 1B:
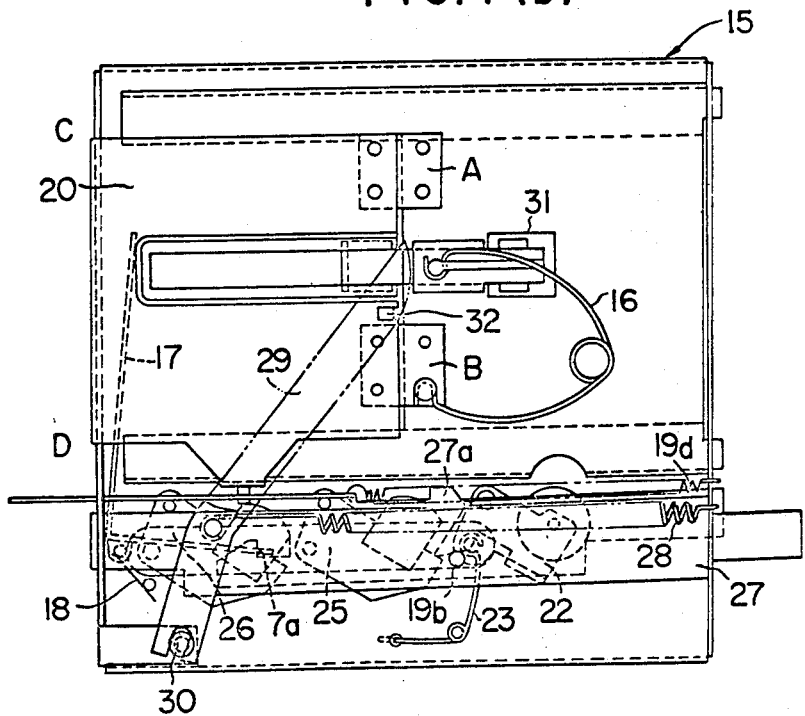

As a result, the slidable plate 19 is shifted to the right-hand side as indicated by an arrow mark by the tension of a tension spring 19d attached to a rising or vertical portion of the slidable plate 19, in which a generally inclining slit or groove 19a is formed for engaging with a projection 20a of the suspending plate 20. When the slidable plate 19 is shifted rightward, the guiding projection 20a of the suspending plate 20 is thereby lowered, causing the suspending plate 20 to rotate around its edge CD, and the casing 15 hinged to the suspending plate 20 by means of spring plates A and B, as best seen in FIGS. 1 and 2, thereby descends to the lower position.

Thus, the cassette 9 included in the casing 15 is brought into the operating position engaging with reel shafts provided below the cassette on a reel pedestal (not shown), and also with a capstan and guide shafts. More specifically with the rightward shift of a pin 19b on the slidable plate 19, a pedestal 22 for the pinch roller is rotated around a shaft 22a under the resilient force of a spring 23, and the tape in the cassette 9 placed in the operating position is thereby pinched between the pinch roller and the capstan.

Figure 6:
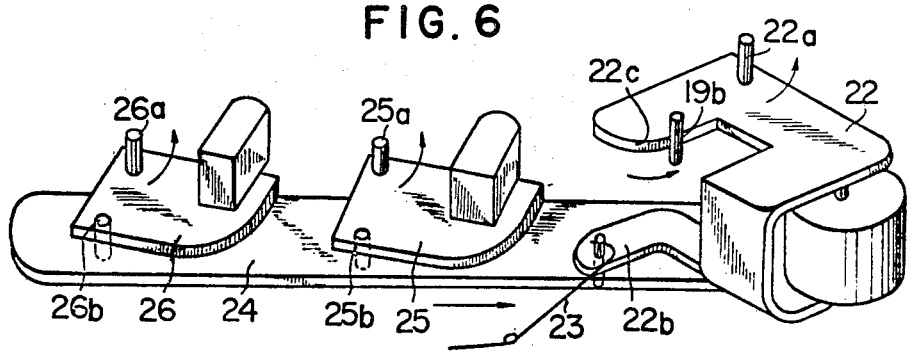

On one arm of the pedestal 22, another shaft 22b is provided, and an interlinking plate 24 as shown in FIG. 6 is rotatably mounted on the shaft 22b so that when the pedestal 22 is rotated around the shaft 22a, interlinking plate 24 is shifted in the arrow direction.

On the interlinking plate 24, there are also provided pins 25b and 26b on which a reproducing head pedestal 25 and an erasing head pedestal 26 are rotatably mounted, respectively, so that when the interlinking plate 24 is shifted in the arrow direction, the reproducing head pedestal 25 and the erasing head pedestal 26 are rotated respectively around shafts 25a and 26a, and these heads are brought into contact with the magnetic tape contained in the cassette. Accordingly, although not shown in the drawing, if an electric switch is provided on the interlinking plate 24, the reproducing or recording operation can be carried out selectively.

Figure 7:
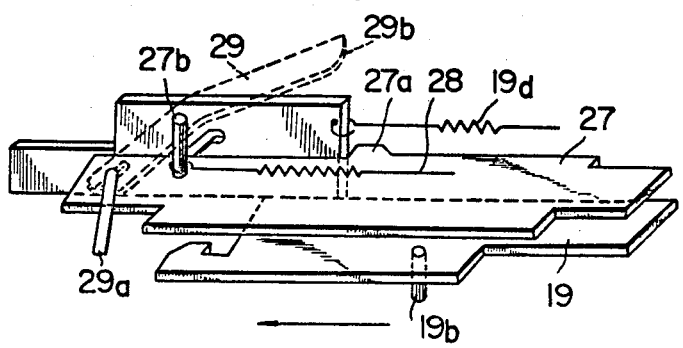
FIG. 7 is a perspective view showing the relation between a cassette dismounting plate and a slidable plate.

When it is desired to stop the operation, a dismounting plate 27 having a push button is depressed leftwardly in the arrow-marked direction as indicated in FIGS. 2 and 7. Since the dismounting plate 27 is then engaged with the slidable plate 19 by a projection 27a, both of the plates 19 and 27 are shifted to the left-hand side as indicated by an arrow mark. The leftward displacement of the slidable plate 19 rotates the pinch roller pedestal 22 by means of the pin 19b mounted on the slidable plate 19 and slidingly contacting an obliquely extending portion on another arm 22c of the pinch roller pedestal 22, whereby the pinch roller pedestal 22 is rotated around the shaft 22a against the resilient force of the spring 23, and the pinch roller is released from the capstan.

Simultaneously, the interlinking plate 24 is displaced in the same direction as that of the dismounting plate 27 by means of the shaft 22b, so that the pedestals 25 and 26 are also rotated, and the magnetic heads retract from the cassette tape. Also, as a result of the displacement of the slidable plate 19 in the arrow direction shown in FIG. 7, the projection 20a of the suspending plate 20 moving within the guiding groove 19a is elevated, whereby the suspending plate is rotated upward around an axis CD. The casing 15, including the cassette 9, hinged to the suspending plate 20 by means of spring plates A and B is thereby elevated, and the cassette 9 is released from the reel shafts, capstan, and the guide shafts.

Furthermore, a knife-edged member 29 provided rotatably around a shaft 27b on the dismounting plate 27 has an elongated groove 29a at its end. Since the elongated groove 29a is engaged with a fixed shaft 30 on the apparatus, the knife-edged member 29 is rotated in the counterclockwise direction with the displacement of the shaft 27b. Thus, when the elevation of the casing 15 has just been completed, the other end 29b of the knife-edged member 29 is at a position where it is pushing the rear end of the sliding member 14. locked in plate When the operator's hand is removed from the push button of the dismounting plate 27, the dismounting plate 27 and the slidable plate engaged therewith are pulled back to the forward direction by the resilient force of the springs 28 and 19d. The forward movement of the dismounting plate 27 now rotates the knife-edged member 29 in the clockwise direction, and the sliding member 14 and cassette 9 start to be pushed back. The backward movement of the sliding member 14 and the cassette 9 allows the locking lever 17 to be rotated back to the position of engagement with the slidable plate 19 by the resilient force of the biasing spring 18, so that the slidable plate 19 is locked position, and further retracting movement of the slidable plate 19 is thereby prevented. As a result, the dismounting plate 27 is disengaged from the slidable plate 19, and the dismounting plate 27 only is retracted to the original position under the action of the spring 28.

With the retracting motion of the dismounting plate 27 under the action of the spring 28, the knife-edged member 29 is continuously moved clockwisely, and the sliding member 14 and the cassette 9 are thereby moved in the backward direction. When the sliding member 14 and the cassette are moved along the cutout groove in the suspending plate 20 backwardly past a position nearest the supporting pin for the other arm of the tumbler spring 16, the cassette 9 is expelled backwardly out of the casing 15 by the resilient force of the tumbler spring 16. At this time, a forward collar portion 14b of the sliding member 14, the downward projection 14c of which has been engaged with the central hole of the tape reel inside of the cassette 9, is disengaged from the central hole upon its arrival at a widened portion 31 of the cutout groove in the suspending plate 15.

A pushing end 29b of the knife-edge member 29 runs over a projecting piece 32 at the last stage of the backward movement so that the engagement thereof with the sliding member 14 is thereby disengaged. For this reason, there is no hindering by the knife-edged member 29 at the time the cassette is newly inserted through the inlet port 15a of the casing 15.

As is apparent from the above description, the cassette mounting and dismounting device according to the present invention makes it possible to mount the cassette automatically into its operating position in the tape recording and reproducing apparatus every time the cassette is simply inserted into the inlet port of the casing, and at the operating position, the tape reels are engaged by the reel shafts, with the tape being positioned to be pinched between the pinch roller and the capstan, guided by the guiding shafts, and contacted by the recording and reproducing head or erasing head, whereby recording or reproducing operation of the apparatus is achieved. When it is desired to dismount the cassette out of the tape recording and reproducing apparatus, the cassette dismounting push button is merely depressed, and the cassette is thereby disengaged from all of the above described members and expelled from the inlet port 15a of the casing 15.

I claim:

1. A cassette mounting device for use in a tape recording and reproducing apparatus and provided with a casing having a mounting port for receiving thereinto a cassette containing a tape reel, comprising in combination and in the casing, a tumbler spring serving to receive and expel the cassette in and out of the port, a slidable plate having a vertical portion provided with a slit, said slit having two axially spaced horizontal sections at different levels connected by an inclined section, means slidably supporting the slidable plate in the direction of cassette insertion, a suspending plate, means on the suspending plate guidable in the slit of the slidable plate operable for lowering and raising the casing when the guidable means is the lower and upper horizontal sections, respectively, a sliding member having a projection adapted to engage with the central hole of the tape reel, the sliding member being slidable against the action of the tumbler spring so that when the cassette is inserted into the casing via the port beyond a predetermined point, the cassette is automatically advanced to the ultimate position in the casing by the tumbler spring, a rotatable locking lever in engagement with the slidable plate and adapted to be abutted against the forward end of the cassette upon complete forward movement of the cassette to release the slidable plate, and a pin on the slidable plate for effecting displacement of a pinch roller, and recording and reproducing magnetic heads to and from the operating position.

2. The cassette mounting device as claimed in claim 1 in which the suspending plate is turnably supported and connected with the casing to effect up and down movement of the casing in accordance with the turnable degree of the suspending plate, said lower section of the slit of the slidable plate being toward the front end of the slidable plate and the other section toward the rear end, and said guidable means on the suspending plate being a projection whereby upon the slidable plate being released and retracted at the last stage of the cassette insertion by rotation of the locking lever, the projection moves from the upper section to the lower section of the slit thus lowering the suspending plate to move the cassette into the operating position to effect operation of the pinch roller and magnetic heads.

3. A cassette dismounting device for use in a tape recording and reproducing apparatus and provided with a casing having a mounting port for receiving thereinto a cassette containing a tape reel, comprising in the casing, a cassette dismounting plate mounted for sliding movement in parallelism to a base plate of the casing, a push button for the dismounting plate, a spring operably connected to the dismounting plate for biasing the dismounting plate continuously to expel the cassette, a knife-edged member rotatable around a shaft on the dismounting plate, the knife-edged member having a bottom end freely engaged with a fixed shaft on the casing base plate, and a front end edge so positioned that such front edge is out of the path of a sliding member prior to insertion of the cassette and is brought to bear against the rear end of the sliding member by operation of the push button whereby the knife-edged member is rotated around the fixed shaft on the base plate for causing movement of the cassette thereby expelling the cassette from the casing.

* * * * *